United States Patent
Pan et al.

(10) Patent No.: US 9,904,558 B1
(45) Date of Patent: Feb. 27, 2018

(54) FIRMWARE UPDATING SYSTEM AND METHOD

(71) Applicant: HON HAI PRECISION INDUSTRY CO., LTD., New Taipei (TW)

(72) Inventors: Sheng-Chung Pan, New Taipei (TW); Yen-Hsuan Chen, New Taipei (TW); Chia-Lung Chiang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 15/246,564

(22) Filed: Aug. 25, 2016

(30) Foreign Application Priority Data

Aug. 3, 2016 (CN) .......................... 2016 1 0627605

(51) Int. Cl.
*G06F 9/44* (2006.01)
*G06F 9/445* (2018.01)

(52) U.S. Cl.
CPC .............. *G06F 9/4416* (2013.01); *G06F 8/65* (2013.01)

(58) Field of Classification Search
CPC ............. G06F 8/65; G06F 8/67; G06F 9/4416
See application file for complete search history.

(56) References Cited

U.S. PATENT DOCUMENTS

| | | | |
|---|---|---|---|
| 2010/0281474 A1* | 11/2010 | Eason | ........................ G06F 8/61 717/172 |
| 2013/0138940 A1* | 5/2013 | Wang | .................. G06F 11/1417 713/2 |
| 2015/0178096 A1* | 6/2015 | Inbaraj | .................. G06F 9/4416 713/2 |

* cited by examiner

*Primary Examiner* — Albert Wang
(74) *Attorney, Agent, or Firm* — ScienBiziP, P.C.

(57) ABSTRACT

A system to update firmware includes one of a number of clients and a server. The server includes a remote login module, an image scanning module, a comparing module, and a firmware updating module. The remote login module remotely logs in the client through SOL. The image scanning module obtains running images of running interface of the client at a preset speed in a preset period. The comparing module compares each running image to a preset PXE interface to determine whether the running image is consistent with the preset PXE interface. When the running image is consistent, the firmware updating module loads operating system image and firmware program image to RAM of the client and controls the client to run the operating system image and the firmware program image to update the firmware of the client. A firmware updating method is also disclosed.

20 Claims, 3 Drawing Sheets

FIRMWARE UPDATING SYSTEM AND METHOD

CROSS-REFERENCE TO RELATED APPLICATIONS

This application claims priority to Chinese Patent Application No. 201610627605.2, filed on Aug. 3, 2016, the contents of which are incorporated by reference herein.

FIELD

The subject matter herein generally relates to firmware updating system and method.

BACKGROUND

Firmwares are updated to improve stability of electronic devices. Firmware is updated through operating system of the electronic device. When the operating system has not been installed in the operating system, the firmware can be updated.

BRIEF DESCRIPTION OF THE DRAWINGS

Implementations of the present technology will now be described, by way of example only, with reference to the attached figures.

DETAILED DESCRIPTION

Figure 1:
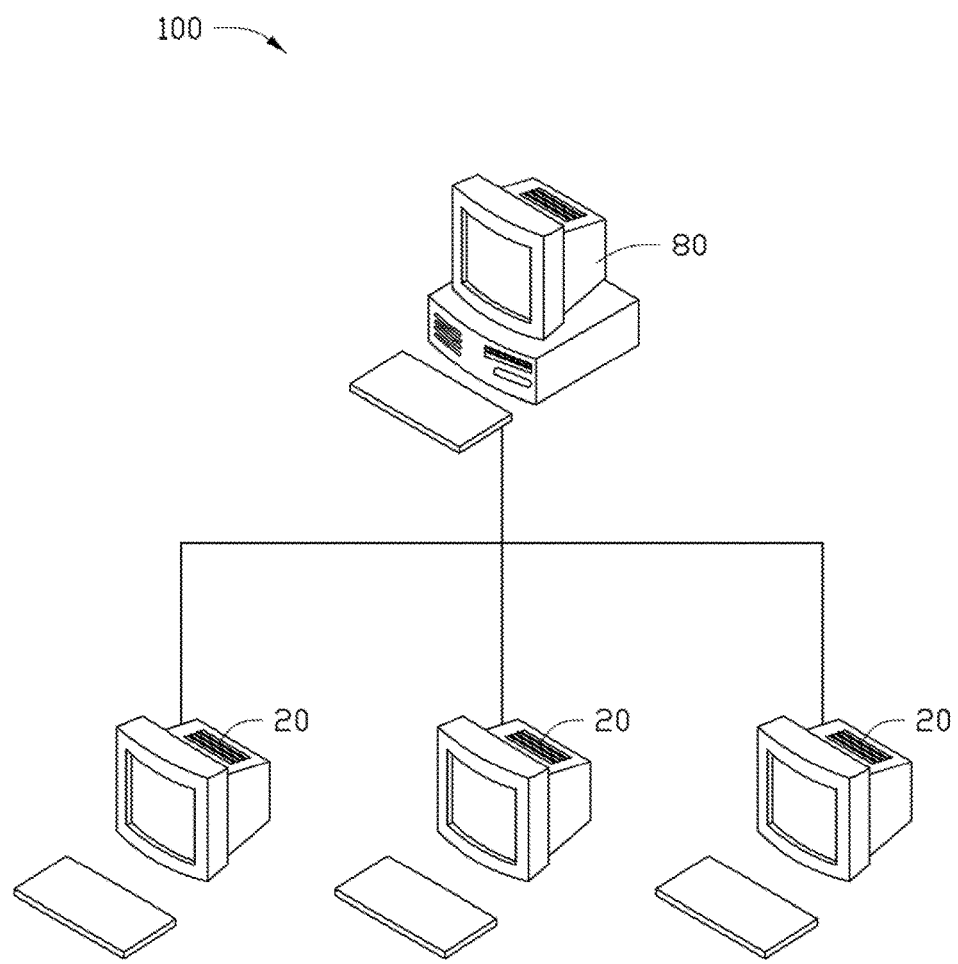
FIG. 1 is a schematic view of a firmware updating system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series, and the like.

The instant disclosure provides a firmware updating system 100. FIG. 1 illustrates the firmware updating system 100 as including a number of clients 20 and a server 80. The server 80 communicates with the clients 20 and with each client 20. The server 80 is configured to update firmware of the client 20.

Figure 2:
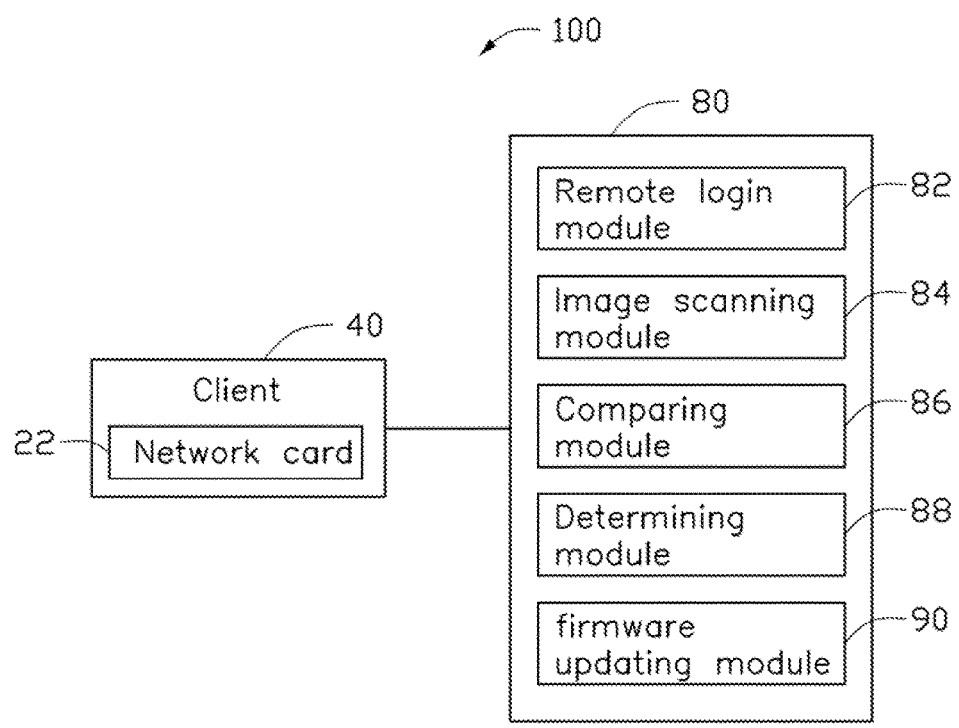
FIG. 2 is a block diagram of the firmware updating system in FIG. 1.

FIG. 2 illustrates the client 20 including a network card 22. The client 20 boots PXE (Preboot Execute Environment) through the network card 22 and requests an IP address from the server 80. The server 80 assigns an IP address to the client 20 corresponding to MAC (Media Access Control) address of the client 20 according to through DHCP (Dynamic Host Configuration Protocol). The server 80 includes a remote login module 82, an image scanning module 84, a comparing module 86, a determining module 88, and a firmware updating module 90. According to the IP address of the client 20, the remote login module 82 is configured to remotely log the client 20 in through SOL (Serial Over Lan). The image scanning module 84 is configured to scan a running interface of the client 20 at a preset speed in a preset period to obtain a number of running images. The preset speed can be three seconds per image. The preset period can be five minutes.

The comparing module 86 is configured to compare each running image to a preset PXE interface to determine whether it is consistent or is not consistent with the preset PXE interface. According to comparison, the determining module 88 is configured to determine whether the client 20 should access a PXE interface. In detail, when there is a running image which is consistent with the preset PXE interface, the determining module 88 determines that the client 20 should access a PXE interface. When a running image which is not consistent with the preset PXE interface, the determining module 88 determines that the client 20 should not access a PXE interface.

When the client 20 accesses the PXE interface, the firmware updating module 90 loads an operating system image and a firmware program image to RAM (random access memory) of the client 20 and controls the client 20 to run the operating system image and the firmware program image to update the firmware of the client 20. In the embodiment, the server 80 provides an interface of selections providing a number of operating systems and a number of firmwares. A user can select an operating system to be run and a firmware to be updated through the selection interface. The firmware updating module 90 loads the operating system image corresponding to the selected operating system and the firmware program image corresponding to the selected firmware to the RAM of the client 20. The operating system on the interface of selections includes a 32-bit operating system and a 64-bit operating system. The user can select the 32-bit operating system or the 64-bit operating system to be run through the interface. The firmware on the interface includes a firmware of BIOS (Basic Input/Output System) and a firmware of BMC (Baseboard management controller). The user can select the firmware of BIOS or/and the firmware of BMC to be updated through the interface.

Figure 3:
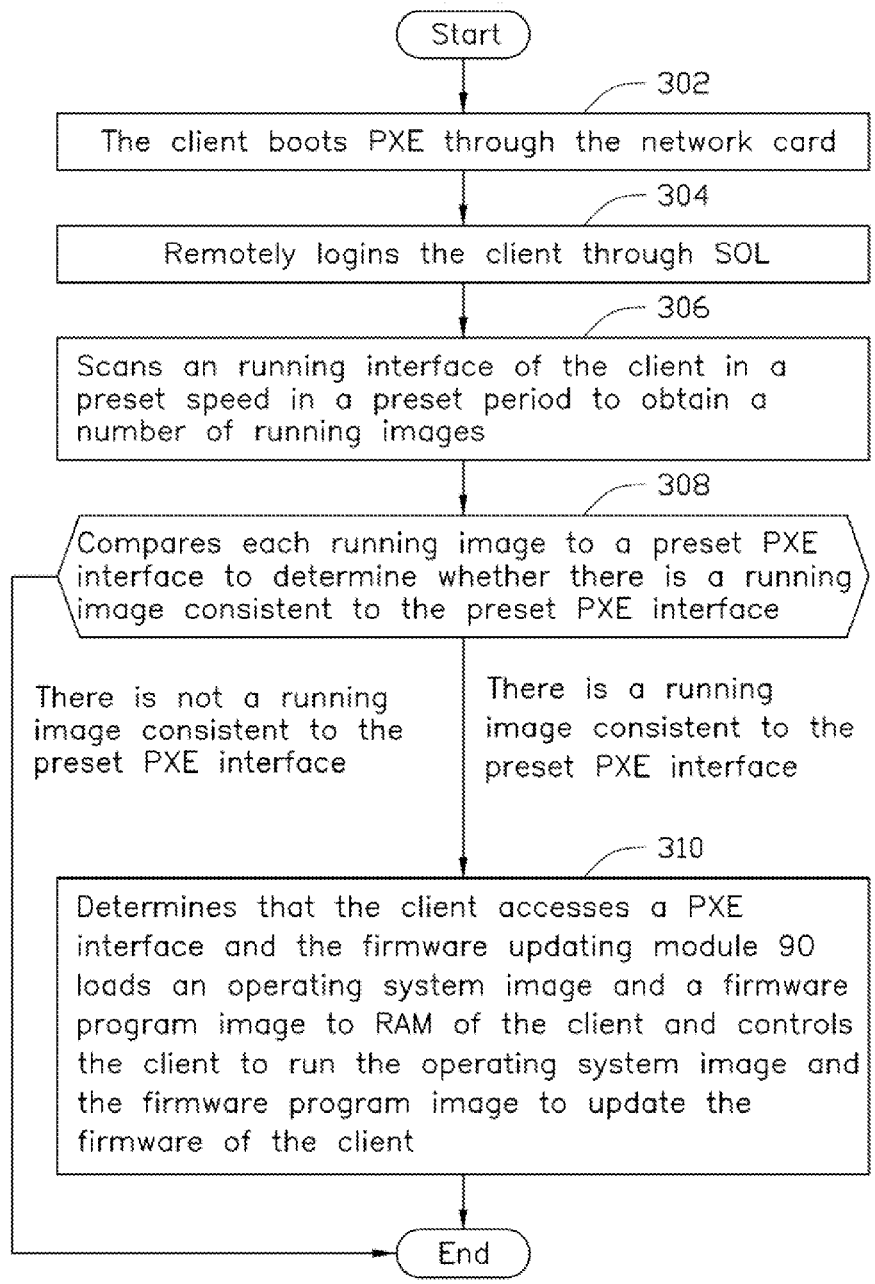
FIG. 3 is a flowchart of a firmware updating method.

FIG. 3 illustrates a firmware updating method according to an embodiment. The order of blocks in FIG. 3 illustrative only and the order of the blocks can change. Additional blocks can be added or fewer blocks may be utilized without departing from this disclosure. The exemplary method begins at block 302.

At block 302, the client 20 boots PXE through the network card 22.

At block 304, according to the IP address of the client 20, the remote login module 82 remotely logs the client 20 in through SOL.

At block 306, the image scanning module 84 scans a running interface of the client 20 at a preset speed in a preset period to obtain a number of running images.

At block 308, the comparing module 86 compares each running image to a preset PXE interface to determine whether there is a running image consistent with the preset PXE interface. If there is a running image consistent with the preset PXE interface, the procedure goes to block 310. Otherwise the procedure ends.

At block 310, the determining module 88 determines that the client 20 should access a PXE interface and the firmware updating module 90 loads an operating system image and a firmware program image to RAM of the client 20. The client 20 is controlled to run the operating system image and the firmware program image to update the firmware of the client.

The embodiments shown and described above are only examples. Even though numerous characteristics and advantages of the present technology have been set forth in the foregoing description, together with details of the structure and function of the present disclosure, the disclosure is illustrative only, and changes may be made in the detail, comprising in matters of shape, size, and arrangement of the parts within the principles of the present disclosure, up to the full extent established by the broad general meaning of the terms used in the claims.

What is claimed is:

1. A firmware updating system comprising:
   at least one client, each client comprising a network card and booting Preboot Execute Environment (PXE) through the network card; and
   a server communicating with each client, the server comprising:
      a remote login module configured to remotely login the client through SOL according to IP address of the client;
      an image scanning module configured to scan an running interface of the client in a preset speed in a preset period to obtain a number of running images;
      a comparing module configured to compare each running image to a preset PXE interface to determine whether there is a running image consistent to the preset PXE interface;
      a determining module configured to determine that whether the client accesses a PXE interface according to comparing result; and
      a firmware updating module configured to load an operating system image and a firmware program image to RAM of the client and control the client to run the operating system image and the firmware program image to update the firmware of the client when the client accesses a PXE interface.

2. The firmware updating system as claimed in claim 1, wherein the preset speed is three seconds per image.

3. The firmware updating system as claimed in claim 1, wherein the preset period is five minutes.

4. The firmware updating system as claimed in claim 1, wherein when there is a running image consistent to the preset PXE interface, the determining module determines that the client accesses a PXE interface.

5. The firmware updating system as claimed in claim 1, wherein when there is not a running image consistent to the preset PXE interface, the determining module determines that the client does not access a PXE interface.

6. The firmware updating system as claimed in claim 1, wherein the server provides a selection interface providing a number of operating systems and a number of firmwares for user to select the operating system to be run and the firmware to be updated, the firmware updating module loads the operating system image corresponding to the selected operating system and the firmware program image corresponding to the selected firmware to the RAM of the client.

7. The firmware updating system as claimed in claim 6, wherein the operating system on the selection interface comprises a 32-bit operating system and a 64-bit operating system.

8. The firmware updating system as claimed in claim 6, wherein the firmware on the selection interface comprises a firmware of BIOS and a firmware of BMC.

9. The firmware updating system as claimed in claim 8, wherein a user can selects both the firmware of BIOS and the firmware of BMC to be updated through the selection interface.

10. A firmware updating system comprising:
    a client comprising a network card and booting Preboot Execute Environment (PXE) through the network card;
    a server communicating with the client, the server comprising:
       a remote login module configured to remotely login the client through SOL;
       an image scanning module configured to obtain a number of running images of running interface of the client in a preset speed in a preset period;
       a comparing module configured to compare each running image to a preset PXE interface to determine whether the running image consistent to the preset PXE interface;
       a determining module configured to determine that the client accesses a PXE interface when the running image consistent to the preset PXE interface; and
       a firmware updating module configured to load an operating system image and a firmware program image to RAM of the client and control the client to run the operating system image and the firmware program image to update the firmware of the client when the client accesses a PXE interface.

11. The firmware updating system as claimed in claim 10, wherein the preset speed is three seconds per image.

12. The firmware updating system as claimed in claim 10, wherein the preset period is five minutes.

13. The firmware updating system as claimed in claim 10, wherein when the running image is not consistent to the preset PXE interface, the determining module determines that the client does not access a PXE interface.

14. The firmware updating system as claimed in claim 10, wherein the server provides a selection interface providing a number of operating systems and a number of firmwares for user to select the operating system to be run and the firmware to be updated, the firmware updating module loads the operating system image corresponding to the selected operating system and the firmware program image corresponding to the selected firmware to the RAM of the client.

15. The firmware updating system as claimed in claim 14 wherein the operating system on the selection interface comprises a 32-bit operating system and a 64-bit operating system.

16. The firmware updating system as claimed in claim 14 wherein the firmware on the selection interface comprises a firmware of BIOS and a firmware of BMC.

17. The firmware updating system as claimed in claim 16, wherein a user can select both the firmware of BIOS and the firmware of BMC to be updated through the selection interface.

18. A firmware updating method comprising:
    booting Preboot Execute Environment (PXE) of a client through a network card of the client;
    remotely loginning the client through SOL through a server communicating with the client;
    scanning an running interface of the client in a preset speed in a preset period to obtain a number of running images;

comparing each running image to a preset PXE interface to determine whether there is a running image consistent to the preset PXE interface;

determining that the client accesses a PXE interface when the there is a running image consistent to the preset PXE interface; and loading an operating system image and a firmware program image to RAM of the client and controlling the client to run the operating system image and the firmware program image to update the firmware of the client when the client accesses the PXE interface.

19. The firmware updating method as claimed in claim 18, wherein the preset speed is three seconds per image.

20. The firmware updating method as claimed in claim 18, wherein the preset period is five minutes.

* * * * *